United States Patent [19]

Hardesty, Jr. et al.

[11] 3,921,139
[45] Nov. 18, 1975

[54] TEST SYSTEM HAVING MEMORY MEANS AT TEST MODULE

[75] Inventors: Samuel J. Hardesty, Jr., Linthicum; Raymond A. Lloyd, Laurel, both of Md.

[73] Assignee: Westinghouse Electric Corporation, Pittsburgh, Pa.

[22] Filed: Mar. 8, 1974

[21] Appl. No.: 449,589

[52] U.S. Cl. .............................. 340/152 R; 340/151
[51] Int. Cl.² ............................................. H04Q 9/00
[58] Field of Search ........... 340/408, 151, 163, 214, 340/183, 203, 152 R

[56] References Cited
UNITED STATES PATENTS

| 3,383,658 | 5/1968 | Martin | 340/151 X |
| 3,435,416 | 3/1969 | Kretsch | 340/163 |

Primary Examiner—Harold I. Pitts
Attorney, Agent, or Firm—J. B. Hinson

[57] ABSTRACT

A system for independently determining the operational status of one or more circuits or units is disclosed. The system includes one or more test modules with at least one module being associated with each unit or circuit to be tested. The test modules communicate with a test console via address and results data busses. The individual modules may continually test the associated unit and communicate the results of the test to the console on request or the test may be initiated by signals generated by the console and the results of the test communicated to the console on request. The console may be manually operated, that is, the operator specifies what test is to be performed. The test may also be automatically performed under the control of programmed digital computer. Each of the test modules may be incorporated into the apparatus to be tested as the apparatus is being constructed.

3 Claims, 3 Drawing Figures

TEST SYSTEM HAVING MEMORY MEANS AT TEST MODULE

BACKGROUND OF THE INVENTION

1. Field of the Invention

The invention relates to test systems and more particularly to built-in test systems utilizing a plurality of substantially identical test modules which may be combined to form a complex test system.

2. Description of the Prior Art

Most prior art built-in test systems were custom designed for the individual piece of equipment to be tested. This was both expensive in terms of the amount of hardware required and forced each piece of test equipment to be individually considered as far as circuitry for performing the test was concerned. These additional cost and other trade-offs resulted in a situation in which the built-in test was almost always inadequate because it was designed as a low cost afterthought item. These problems are substantially reduced by the disclosed invention which provides a standard test module which can be incorporated into the apparatus to be tested at the design phase. The module has sufficient capability to permit complex tests to be performed at a low cost because the test module is are standardized. A plurality of the test modules can be coupled to a common test console to form a complex test system.

SUMMARY OF THE INVENTION

This invention provides an improved built-in test system. The system utilizes standardized test modules with at least one test module being associated with every unit to be tested. The test modules communicate on a time shared basis with a test console via an address bus and a results bus.

The test modules may operate in two basic modes. In the first mode of operation, referred to as the synchronous mode, a signal consisting of an address which identifies the module to be initiated and a signal indicating that the module identified by the address is to test its associated unit is coupled to the test modules via the address bus. The address portion of the signal is decoded by each of the test modules and the module assigned the address being transmitted initiates a test of the apparatus associated with that test module. To determine the results of the test a second signal consisting of the same address is sent via the address bus. This signal also includes a bit indicating that this is an interrogate signal. When the address and the interrogate signal have been decoded two bits are transmitted to the test console via the results bus. The first bit indicates that the test previously requested has been completed and the second bit indicates the results of the test.

In the second mode of operation, referred to as the non-synchronous mode, the tests are continually made by each of the test modules associated with the units to be tested and when the address specifying the particular unit is decoded by the associated test module the results of the test previously performed by that test module are automatically gated to the test console via the results bus in a manner substantially identical with that described above. The choice of mode of operation will depend on the application.

DESCRIPTION OF THE PREFERRED EMBODIMENT

Figure 1:
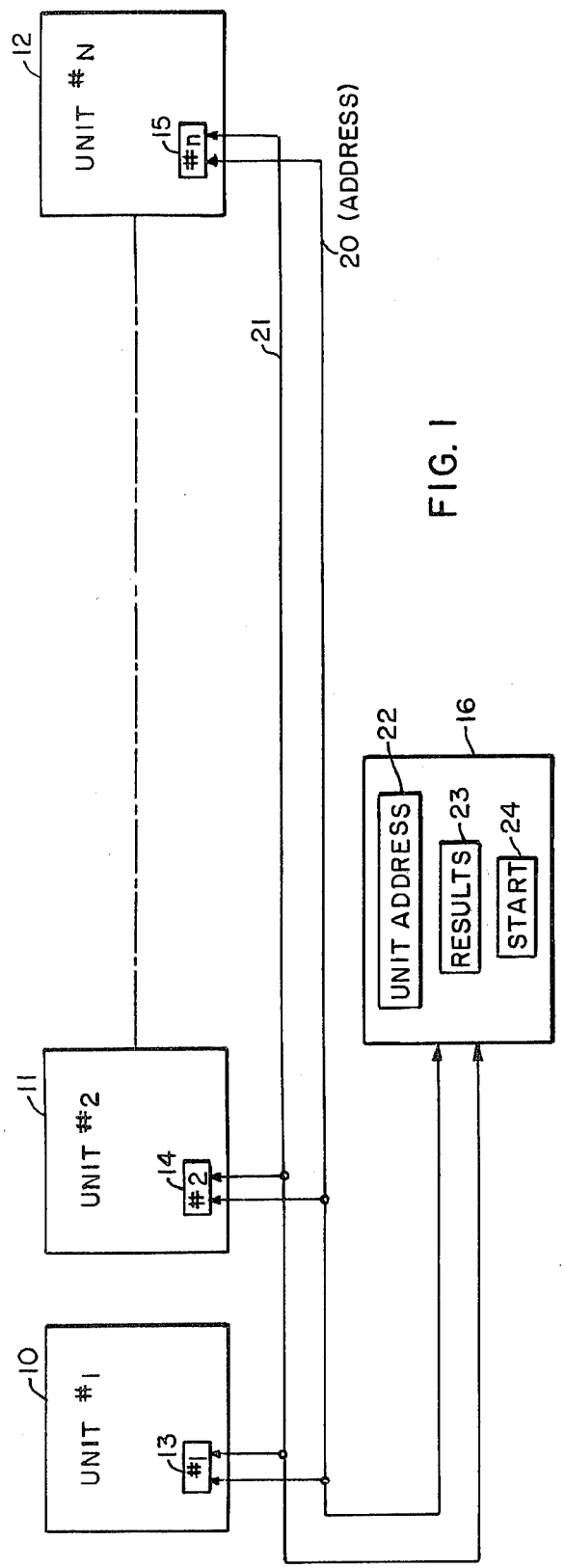
FIG. 1 is a functional block diagram of the system.

The preferred embodiment of the system is illustrated in FIG. 1. The system is designed to test a number of individual units with the units to be tested, numbered 1 through n, being illustrated at reference numerals 10, 11 and 12. Normally each of the units, 1 through n, would be a component of a larger system and in most cases each of these the units would be an individually replaceable component or circuit. Each of the units, 1 through n, has mounted thereon a test module, respectively illustrated at reference numerals 13, 14 and 15. Each of the test modules communicate with a test console 16 by way of two serial data buses illustrated at reference numerals 20 and 21.

The test modules 13, 14 and 15 are controlled by a test console illustrated at reference number 16. The console contains an address unit 22, a result unit 23 and a start switch 24. To perform a test, for example on unit number 1 illustrated at reference numeral 10 using the synchronous mode of operation, the address associated with the first test module 13 would be entered into the address unit and the start switch 24 would be depressed by the operator. In response to the depression of the start switch 24, the test console 16 generates a digital test signal which includes a start code, an address identifying the first test module, illustrated at reference numeral 13, and a mode bit. The digital test signal is coupled to all of the test modules 13, 14 and 15 via the address bus 20. The address portion of the test signal is decoded by each of the test modules to determine which module is being addressed. The decoding of the address in conjunction with the mode bit which follows the address, causes the first test module 13 to initiate a test of unit number 1. Following the test signal, the test console 16 generates an interrogate signal. This signal includes an address portion which identifies the first test module 13 and a mode bit. Immediately following the mode bit, the test console 16 begins to monitor the results bus for the test results available signal. Following the results available signal, a second signal indicative of the operational status of the unit tested is also available on the results bus. This information is displayed on the results indicator 23. The delay between the mode bit and the results available signal is determined by the time required to test the associated unit. The details of the various signals will be discussed later. The other units, 1 through n can be similarly tested.

In the non-synchronous mode, the digital test signals are not needed or generated by the test console 16 because in the absence of the interrogate signal each of the test modules continuously test the associated units. The receipt of the interrogate signal inhibits the beginning of further test and gates the results of the last test to the results buss in a manner similar to the synchronous mode.

Figure 2:
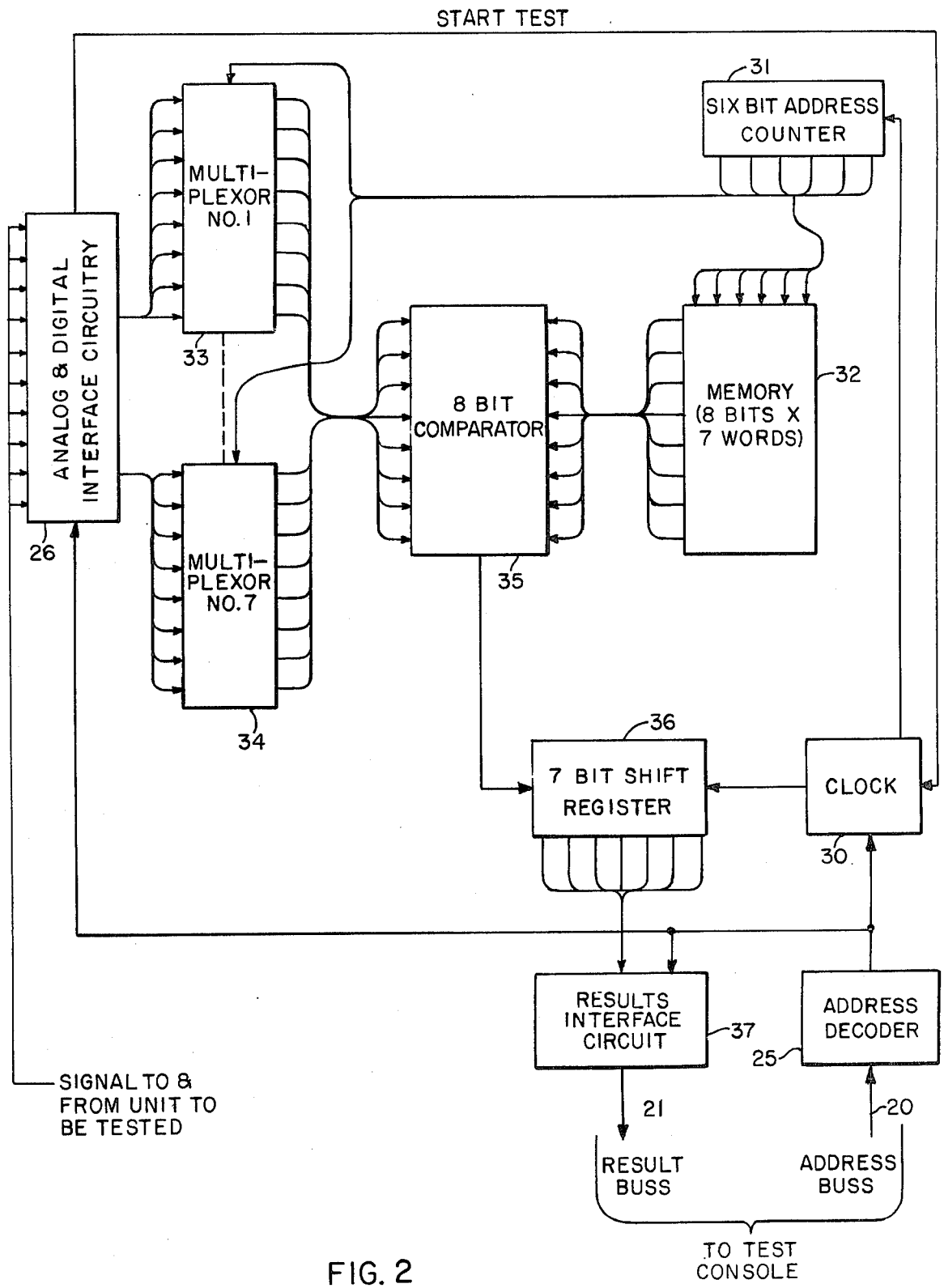
FIG. 2 is a functional block diagram of the test modules.

A typical test module, for example test module number 1 illustrated at reference numeral 13 of FIG. 1, is illustrated in more detail in FIG. 2. Each of the functions illustrated in FIG. 2 can be implemented using conventional logic circuitry for example commercially available TTL integrated circuits. Some of the details of the test module will depend on the family of circuits used to implement the module. Therefore the detailed logic diagram is now shown.

As previously discussed each of the test modules communicates with the test console 16 by way of the address bus 20 and the results bus 21. In the synchronous mode, the cycle of any test module is initiated by the receipt of a start code and an address by the address decoder logic 25. The details of this signal will be discussed later. When the address decoder 25 receives and decodes an address identifying the particular test module the address decoder 25 will generate a signal indicating that the particular test module is being addressed. This signal is coupled to the analog and digital interface circuitry 26 and to the clock circuit 30. This signal causes the analog and digital interface circuit 26 to sample signals indicative of the operational status of the associated unit and store the results as digital signals in a digital memory which is a part of the interface circuitry. The digital signals stored in the memory are coupled to the output lines of the analog and digital interface circuitry 26. After the signals on the output lines of the analog and digital interface circuitry 56 have stabilized a start signal is coupled to the clock 30 by the interface circuitry. When the clock 30 receives the start signal it generates a clock signal containing six pulses. Each of these pulses steps a six-bit counter 31 one step. The six-bit address counter 31 may be a shift register that shifts a one to successive stages of the shift register for each clock pulse. Using a shift register can simplify decoding if the memory 32 is small.

The outputs of the six-bit counters 31 are coupled to the address inputs of the memory 32. These address inputs specify which location in memory 32 will be read. The memory 32 is preferably a read only memory containing seven words with eight bits per word. The memory 32 is preferably a type that can have words permanently stored therein but which cannot be altered by loss of power of other accidental means. Such a memory can be constructed as a diode matrix with value of each bit being determined by the presence or absence of a diode at a predetermined location in the matrix. It is also anticipated that current research will lead to the development of suitable solid state electronically alterable memories.

The output signals of the counter 31 are also coupled to the select inputs of digital multiplexers 33 and 34. For each address generated by address counter 31 one of the multiplexers will be enabled. The other inputs to the multiplexers are signals from the analog to digital interface circuitry 26. The outputs of the multiplexers 33 and 34 are coupled to one input of an eight bit comparator 35. The other input to the comparator 35 is the output signals of the memory 32. Only seven multiplexers are illustrated in FIG. 2. The number is selected such that there is a one-to-one correspondence between the number of addresses generated by the address counter 31 and the multiplexers. The word length of the memory 32 is also selected so that the number of bits in each word corresponds to the number of outputs from each of the multiplexers. The reason for this will be subsequently explained.

As a part of the set-up procedure for each of the test modules, digital data words are stored in each storage location by the memory 32. Each of these data words are identical on a bit-by-bit basis with the expected output of one of the multiplexer 33. For example, the first location in the memory 32 would correspond with the expected output of the first multiplexer 33. As the address counter 31 steps through each of its values, the multiplexer one through seven will be sequentially enabled. As a particular multiplexer, for example multiplexer number 1 is enabled, the contents of storage location number 1 of memory 32 will be read. The word stored in this location is selected to be identical on a bit-by-bit basis with the expected output of multiplexer number 1. The output of multiplexer number 1 and the contents by storage location number 1 of memory 32 are compared by the comparator 35. Either a logic "one" or "zero" is shifted into a shift register as a result of each comparison. The logic "one" and "zero" conditions respectively corresponding to the expected and the unexpected results.

When the address counter 31 has cycled through all its values, the test of the apparatus associated with the test module has been completed. All "ones" in the storage register 36 correspond to a finding that the associated apparatus is operational. Conversely, a logic "zero" in any position indicates that the apparatus is faulty.

If the mode bit immediately following the address bit indicates that the cycle is to be an interrogate cycle rather than a test cycle, the decoder logic 25 will send a signal to the interface circuitry 37. The interface circuitry 37 will generate a first pulse which is coupled to the results bus 21 indicating that the test previoulsy performed is complete and that the result is available. Immediately following the pulse indicating that the results of previous tests are available will be a bit indicating whether or not the unit tested is operational. These pulses will be utilized by the test console 15 to update the results indicator 23.

Figure 3:
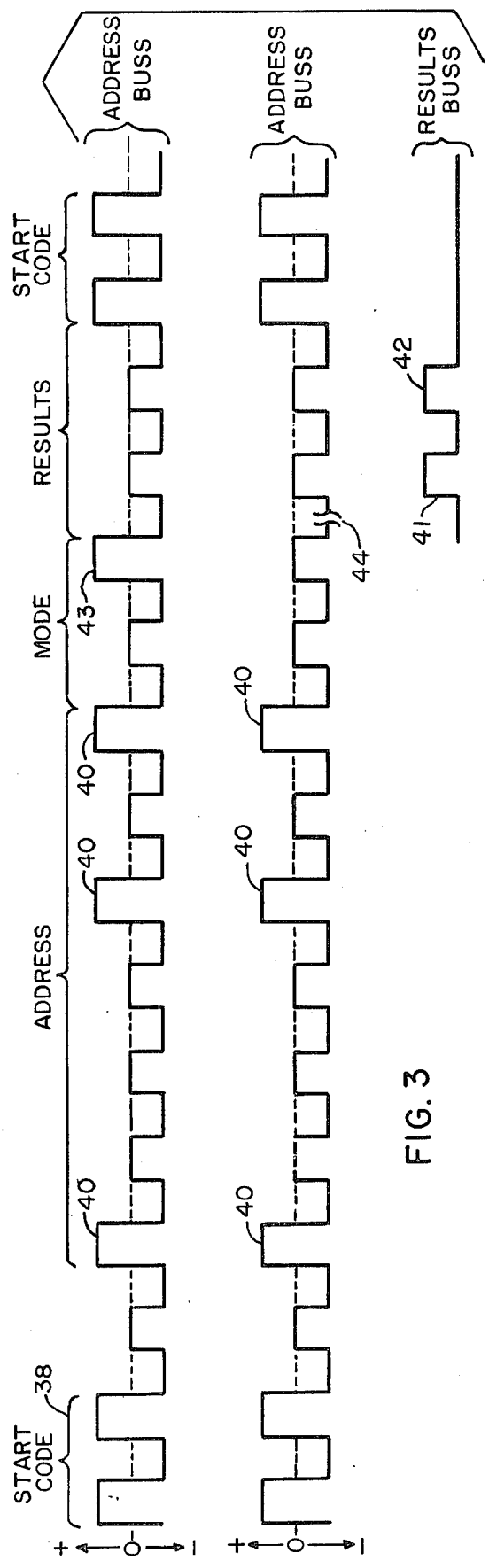
FIG. 3 is a timing and signal chart illustrating how data is transferred via the address and data busses.

The details of the timing of the information on the address and result busses 21 and 22 are indicated in FIG. 3. The first factor to be noted is that the digital signal appearing on the address bus is a three level signal which goes from zero to a plus value and to a minus value. Circuitry is included in the address decoder 25 which separates this signal into its positive and negative portions with the negative portions forming a digital clock signal and the positive portions forming a data signal.

Each cycle of the test modules, whether it is a test or interrogate cycle, begins with a start code. A start code signal is defined as two successive clock pulses during which the data portion of the signal appearing on the address bus 20 is a logic one. This is indicated by the data portion of the signal being at the plus level. A typical start code is illustrated at reference numeral 38. Following the start code the bits of the address and the mode control bit are transmitted. However, during the time when the address and mode control bits are being transmitted only every other pulse of the clock signal is utilized. This provides a convenient means for the address decoder logic 25 to detect the start pulse. This may be conveniently thought of as pulse width modulation.

In the illustrated system, sufficient address bits are provided to address 16 test modules. As previously explained only every other clock pulse is utilized to shift the address with three typical bits of the address being illustrated at reference numeral 40. Immediately following the address is a mode bit which indicates to the test module whether a test is to be initiated or the results of a test previously performed and stored in shift register 36 are to be gated out. This bit is illustrated at reference numeral 43 with a high level indicating that a test is to be initiated. Thus the top waveform in FIG. 3 is the waveform which will be generated by the test console 16 when a test is to be initiated. Following the mode bit is two more clock pulses which are normally allocated to gating the results of the test console. In the test cycle these clock pulses will not normally be utilized. Immediately following the period allocated to gate the results to the test console follows the start code for the next cycle is generated.

The data generated on the address bus 20 during an interrogate cycle is illustrated in the second line of FIG. 3. The start code and the address portions of the signal are identical to those previously described for the test cycle. However, the mode bit 43 is now a logic zero indicating that the cycle is to be an interrogate cycle. Following the mode pulse, a pulse is generated on the results bus indicating that the results of a previous test are available. In the interrogate cycle the generation of further clock pulses by the test console 16 is inhibited until this pulse is received by the test console. This delay is illustrated at reference numeral 44. The results available pulse is illustrated at reference numberal 41. Immediately following the results available pulse illustrated at reference numeral 41 is a second pulse. If this pulse is a logic "one", as illustrated in FIG. 3, the test previously made on the associated unit indicated the unit was operative. This pulse is illustrated as reference numeral 42. If, on the other hand, the test indicated that the unit was inoperative this signal will be a logic "zero."

It is obvious that the above described system could be modified such that each of the test modules 1 through n illustrated at reference numerals 13 through 15 could sequentially test the associated units without requiring the test signal illustrated in FIG. 3. Such a modification only requires a slight modification of the address decoder 25 and the clock 30 so that the clock continuously cycles except during the time an interrogate cycle is in progress. Operating in this mode would require that sufficient time be allowed between the decoding of the address and the gating of the results to the results bus to assure that the test module addressed could complete the test specified and gate out the results of the test. This mode of operation was previosly described as the non-synchronous mode. The necessary modification to the test modules and the test console are believed to be obvious in view of the above description and the prior art. Therefore, they are not shown in detail. The test console 16 could also be replaced by a digital computer. This arrangement may be advantageous in systems where the computer may be available for other reasons.

I claim:
1. A test module for use as a subsection of a complex test system, said module comprising:
 a. test means for testing the apparatus associated with said module by comparing a digital signal indicative of the operational status of said apparatus to a digital signal stored in a memory which is part of said test module;
 b. gating means for gating the results of tests performed on said apparatus by said test means to a results bus;
 c. decoding means for receiving first and second identification signals from a test console via an address bus, said decoding means including apparatus for decoding said first identification signal to generate a signal which initiates said test means such that said test means performs predetermined tests on said associated apparatus and for decoding said second identification signal to generate a second signal which gates the results of said test to said console via said results bus; wherein
 d. said first and second identification signals are coded such that a plurality of said modules can communicate with a single test console by time sharing said results and address buses.

2. A test module for use as a subsection of a complex test system, said module comprising:
 a. test means for testing apparatus associated with said module by comparing a digital signal indicative of the operational status of said apparatus to a digital signal stored in a memory which is part of said test module;
 b. gating means for gating the results of test performed on said apparatus by said test means via a results bus;
 c. decoding means for receiving an identification signal from a test console via a first bus and a clock signal via a clock bus, said decoding means including apparatus for decoding said identification signal to generate a signal which gates the results of said test to said console via said data bus; wherein
 d. said identification signal is coded such that a plurality of said modules can communicate with a single console by time sharing said data and clock data buses.

3. A test module for use as a subsection of a complex test system, said module comprising:
 a. decoding means for receiving and decoding an identification signal, said identificatiton signal being received via an address bus, said identification signal including first and second coded portions, said first portion being decoded by said decoding means to generate a test initiate signal and said second portion being decoded to generate a gate result signal;
 b. test means responsive to said test initiate signal for testing the apparatus associated with said module to determine its operational status, and means for gating the results of the test performed on said associated apparatus to a results bus in response to said gate signal with the operational status of said associated apparatus being determined by comparing digital signals indicative of the operational status of said apparatus to a digital signal stored in a memory which is a part of said test module;
 d. means permitting a plurality of said test modules to communicate with a common test console via two serial buses on a time-shared basis, with a bipolar signal being utilized to transmit said identification signals and a clock signal to said module via said address bus.

* * * * *